United States Patent Office 2,791,453
Patented May 7, 1957

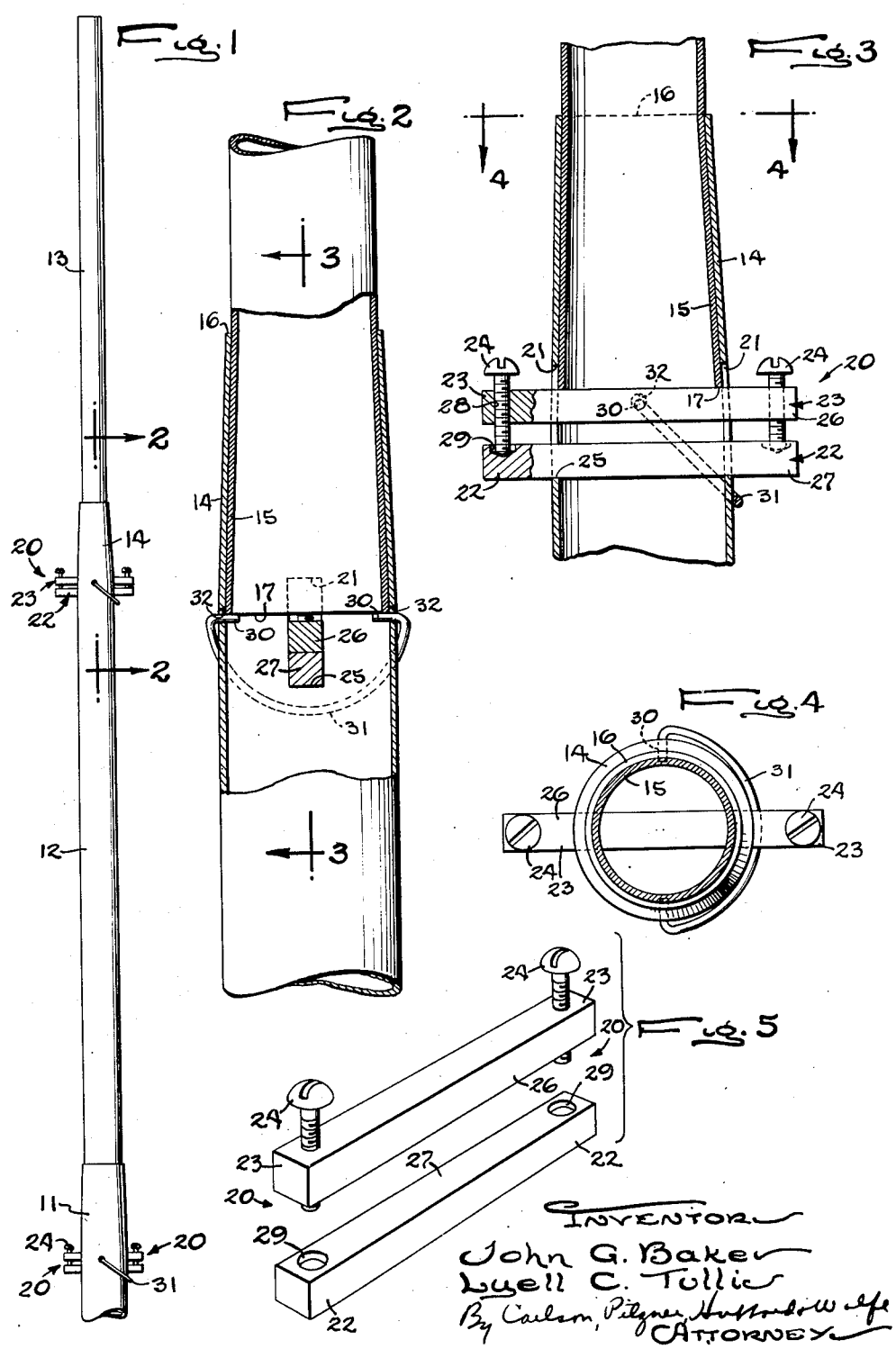

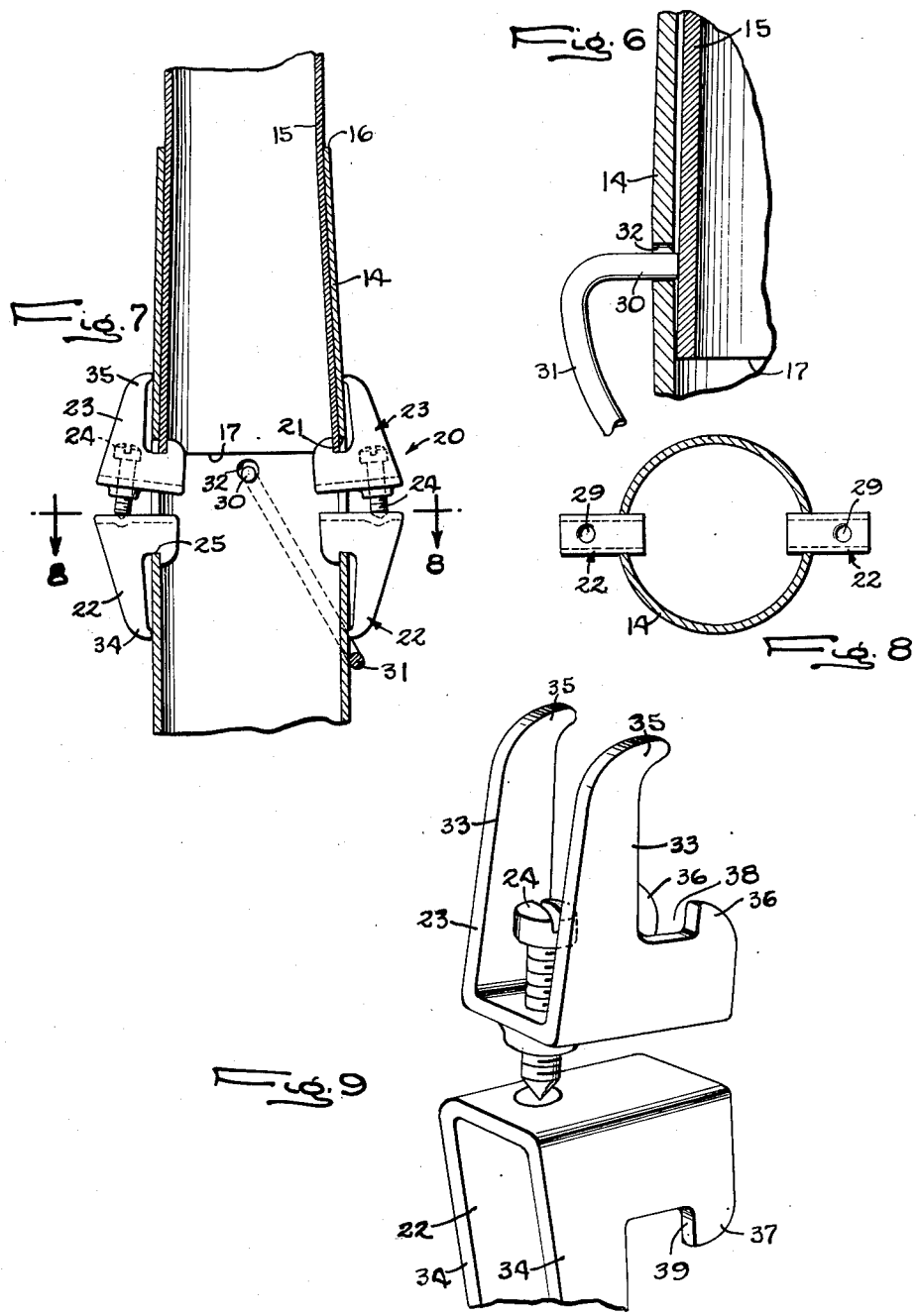

2,791,453

EXTENDIBLE MAST JOINT

John Gordon Baker and Lyell C. Tullis, Evansville, Wis., assignors to Baker Manufacturing Company, Evansville, Wis., a corporation of Wisconsin Application July 14, 1951, Serial No. 236,765

1 Claim. (Cl. 287—58)

This invention relates to extendible structures such as towers, masts, and the like which may support radio and television antennae. More particularly, the invention relates to a mast of the type having two sections telescoping with each other at adjacent ends and joined rigidly in wedged relation when the sections are extended.

The general object is to provide a new and improved joint for a mast of the above character which is sturdy and economical in construction and yet may be assembled and dissembled easily and safely with minimum effort.

Another object is to provide a mast joint incorporating a novel device expansible against parts of the tubes to wedge the latter together.

A more detailed object is to provide such an expanding device having parts which may be separated by a simple screw and which act against the end of the inner mast section and the defining edge of a hole in the outer section.

A further object is to provide a novel catch operable automatically as an incident to extension of the sections to latch and hold the latter in a partially extended relation preparatory to insertion of the expanding device.

The invention also resides in the novel and simple constructions of the automatic catch and the joint expander.

Other objects and advantages of the invention will become apparent from the following detailed description taken in connection with the accompanying drawings, in which Figure 1 is a fragmentary elevational view of an extended mast embodying the novel features of the present invention.

Figs. 2 and 3 are fragmentary sectional views taken along the line 2—2 of Fig. 1 and showing the parts of the mast joint in partially and fully extended positions.

Fig. 4 is a cross-section taken along the line 4—4 of Fig. 3.

Fig. 5 is an exploded perspective view of one form of the joint expanders.

Fig. 6 is a fragmentary sectional view similar to Fig. 2 with the tube sections in a different position.

Fig. 7 is a view similar to Fig. 3 showing a modified form of the joint expander.

Fig. 8 is a cross-section taken along the line 8—8 of Fig. 7.

Fig. 9 is a perspective view of one of the joint expanders shown in Fig. 7.

For purposes of illustration, the invention is shown in the drawings incorporated in a mast comprising elongated tubes 11, 12 and 13 of progressively smaller size adapted, when in collapsed relation, to telescope loosely, but when extended as shown in Figs. 1 and 3, to wedge together at their overlapping end portions 14 and 15 whereby to form rigid joints. For this purpose, the end portion 14 of the outer tube converges to its upper end 16 and the lower end portion 15 of the inner tube diverges to its lower end 17 with a complemental or matching taper.

In accordance with the present invention, extension of the sections into wedged relation is effected by expanding devices 20 insertable through holes 21 in the outer tube section 14 and each having two parts 22 and 23 separable by manually turning one or more screws 24 and respectively acting against the inner tube end 17 and the inner defining edge 25 of the hole 21 to force the inner tube section 15 outwardly to the wedged position.

Preferably two such expanding devices are employed in each joint, and accordingly two holes 21 are punched through diametrically opposite sides of the outer tube 15. These holes, which herein are rectangular slots elongated in the direction of the tube axis, are spaced inwardly from the end 16 of the tube section 14 so as to be partially uncovered in the partially extended position of the sections 14 and 15 as shown in Fig. 2 as well as in the wedged position of the sections shown in Fig. 3.

In the preferred form shown in Figs. 1 to 5, the parts 22, 23 of the two expanding devices 20 comprise the opposite end portions of two rigid bars 26 and 27 of uniform cross-section and slightly narrower than the slots 21. The height of the bars is such that when they are stacked one on the other, they may be inserted endwise through the parts of the holes 21 which are uncovered when the tube sections 14 and 15 are in the partially extended position shown in Fig. 2. The screws of the two devices are threaded through transverse holes 28 near the outer ends of the bar 26 so that the screws extend longitudinally of the mast axis and are spaced outwardly a short distance from the exterior of the outer tube section 14. The ends of the screw shanks are adapted to seat in shallow recesses 29 in the top of the lower bar 27.

Means is provided for latching the tube sections 14 and 15 and positively holding the same in the partially extended position (Fig. 2) while the expanding devices 20 are being inserted through the holes 21. Herein, this means operates automatically as an incident to partial extension of the sections and comprises detents 30 supported by the outer section 14 and urged inwardly so as to move in beneath the lower end 17 of the inner section 15 as the latter is raised to a position uncovering enough of the holes 21 to permit insertion of the expanding devices 20. Preferably, the detents 30 comprise the inturned ends of a generally semi-circular U-shaped bail 31 of resilient wire straddling the exterior of the outer tube 14 and stressed to contract the ends 30 toward each other. These ends are disposed in apertures 32 punched through the tube section 14 and angularly spaced from the holes 21.

In the collapsed condition of the mast, the bail ends 31 bear against the exterior of the inner tube section 15 as shown in Fig. 6 and ride along the latter as the tube sections are extended. After the inner tube end 17 has uncovered the major length of the holes 21, it passes the detents 30 whereupon the bail contracts and projects the detents in behind the tube end as shown in Fig. 2. The upper mast section is thus temporarily supported short of its wedged position without further effort by the installer.

With the holes 21 thus uncovered, the bars 26, 27 may, when stacked together and after removal of one of the screws 24, be inserted endwise through the alined holes. While the lower bar is resting on the lower defining edges 25 of the holes 21, the screw is reinserted in the bar 26 and the two screws are turned into this bar and seated in the recesses 29. Further turning of the screws separates the two bars, the upper bar coming into abutment with the inner tube end 17 after which the inner tube is raised until the sections 14 and 15 become wedged together as shown in Fig. 3. The installer may thus actuate the expanding devices 20 easily using only one hand if desired.

To disassemble the mast, the procedure is reversed. After release of the expanders 20 and lowering of the inner tube, the catches 30 again become effective. After removal of the expanding devices, the catches 30 may be released readily by spreading the ends of the bail 31.

In the modified form shown in Figs. 7 to 9, the expanding devices 20 are separated fom each other, and the parts 22 and 23 of each are formed as U-shaped sheet metal stampings with the screw hole 28 formed in the closed end of the part 23 and the recess 29 forged in the closed end of the other or lower part 22. The upstanding parallel legs 33 and 34 of the two parts terminate at inwardly curved ends 35 which are adapted to bear against the exterior of the outer tube section 14. Projecting inwardly from the lower ends of the legs 33 and 34 are hooks 36 and 37 defining oppositely facing recesses 38 and 39 respectively adapted to receive the lower end 17 of the inner tube section 15 and the edge 25 at the lower end of the hole 21 in the outer tube section 14.

In the use of the modified expanding devices, the tube sections 14 and 15 are extended to the latched position shown in Fig. 2. The lower U-shaped pieces 22 are inserted through the holes 21 and hooked over the edges 25. Then, with the screw 24 retracted, the hook 36 of the upper piece 23 is inserted in the upper part of the hole. Now, as the screw 24 is turned down to separate the parts, the hook 36 engages the lower end 17 of the inner tube section and raises the latter to the wedged position as shown in Fig. 7. In this movement, the ends 35 bear against and slide along the outer surface of the tube section.

It will be apparent that extension of the tube sections and wedging thereof firmly together is a simple procedure involving raising of the inner tube to the latched position, insertion of the expanding devices 20, and manual turning of the screws 24 without further effort by the installer. At the same time, the mast joint is of extremely simple construction because the expanding devices 20 act against parts of the tube sections that is, the end 17 and the hole edge 25. In addition, the expanding devices themselves are formed of simple parts adapted to be spread apart by turning a screw which is conveniently accessible from the exterior of the joint. By angularly spacing the expanding devices from the latch detents 30 and by adapting the latter as well as the expanding devices 20 to act against the inner end 17 of the inner tube, the two tube sections may be extended and wedged together while in any angular position relative to each other.

We claim as our invention:

In an extendible mast, the combination of, an outer tube having an outwardly converging end portion, an inner member telescoped in said end and having a flared end movable outwardly into wedging engagement within the end portion, said tube having angularly spaced diametrically alined holes therethrough spaced from the end of the tube so as to be uncovered progressively in the outward movement of said member to said wedged position, two bars of greater length than the diameter of said tube and insertable endwise through said holes and tube when said member is extended to a position short of said wedged position, and two screws each threading through the outer end of one of said bars longitudinally of said tube and abutting the other bar whereby said two bars are separated by tightening of said screws.

References Cited in the file of this patent

UNITED STATES PATENTS

| | | |
|---|---|---|
| 338,115 | Terry | Mar. 16, 1886 |
| 1,046,517 | Weber | Dec. 10, 1912 |
| 1,240,183 | Draper | Sept. 18, 1917 |
| 1,343,279 | Reynolds | June 15, 1920 |
| 1,416,896 | Simmons | May 23, 1922 |
| 1,591,110 | Willson | July 6, 1926 |
| 1,599,213 | Coupal | Sept. 7, 1926 |
| 1,672,596 | Zerk | June 5, 1928 |
| 1,711,725 | Edwards | May 7, 1929 |
| 1,943,496 | Thompson | Jan. 16, 1934 |
| 2,427,841 | Dichter | Sept. 23, 1947 |
| 2,675,256 | Cornell | Apr. 13, 1954 |